United States Patent
Reimer

[11] 3,806,992
[45] Apr. 30, 1974

[54] CABLE TENSIONER
[75] Inventor: William A. Reimer, Wheaton, Ill.
[73] Assignee: GTE Automatic Electric Laboratories Incorporated, Northlake, Ill.
[22] Filed: Aug. 13, 1973
[21] Appl. No.: 387,871

[52] U.S. Cl.............................. 24/71.2, 242/100.1
[51] Int. Cl........................ B65h 75/38, A43c 11/00
[58] Field of Search .......... 242/100, 100.1; 24/71.2, 24/DIG. 1

[56] References Cited
UNITED STATES PATENTS
415,897   11/1889   Bradner ........................... 242/100.1
571,761   11/1896   Gulliford......................... 24/71.2 UX Primary Examiner—Donald A. Griffin
Attorney, Agent, or Firm—R. F. Van Epps

[57] ABSTRACT

The invention relates to a cable tensioning device for controllably adjusting the tension in a flexible cable which comprises a spool having a bore extending through its entire length, a cable guide means at its first end face and a rotatable member at its second end face having a bore aligned with the spool bore and a means for bearing against the cable. The cable tensioning device additionally comprises a locking means for locking the rotatable member in fixed relation to the spool so that with a cable threaded through the bores from the first end face and over the outer periphery of the rotatable member bore and spool past the rotatable member cable bearing means and the first end cable guide means, and again through the spool bore from the first end to the second end and through the rotatable member bore, as the rotatable member is rotated relative to the spool, the flexible cable is wound around the spool and thereby placed under controlled tension.

In a preferred form the rotatable member is spring loaded in relation to the spool to provide a constant tension on the cable. In an alternative preferred form, the rotatable member in addition to the spring comprises a pawl arrangement to thereby maintain a minimum tension on the cable. In an additional alternate preferred form both end faces are rotatable with either a spring loading or pawl arrangement provided.

12 Claims, 6 Drawing Figures

PATENTED APR 30 1974 3,806,992
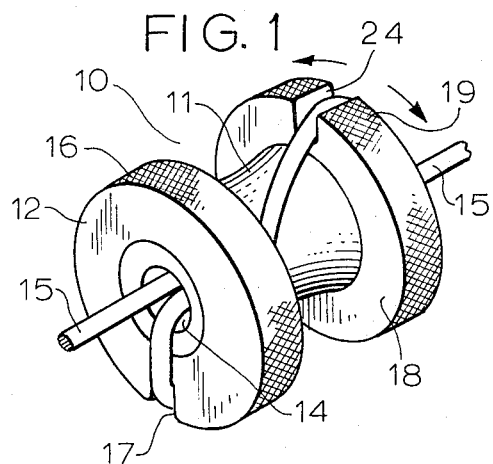
FIG. 1
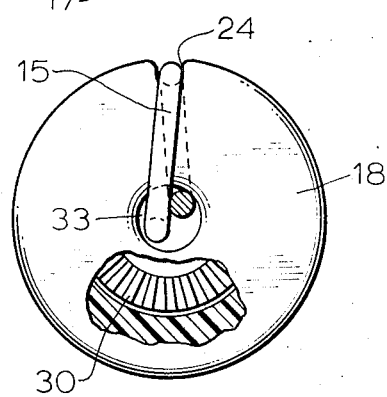
FIG. 3
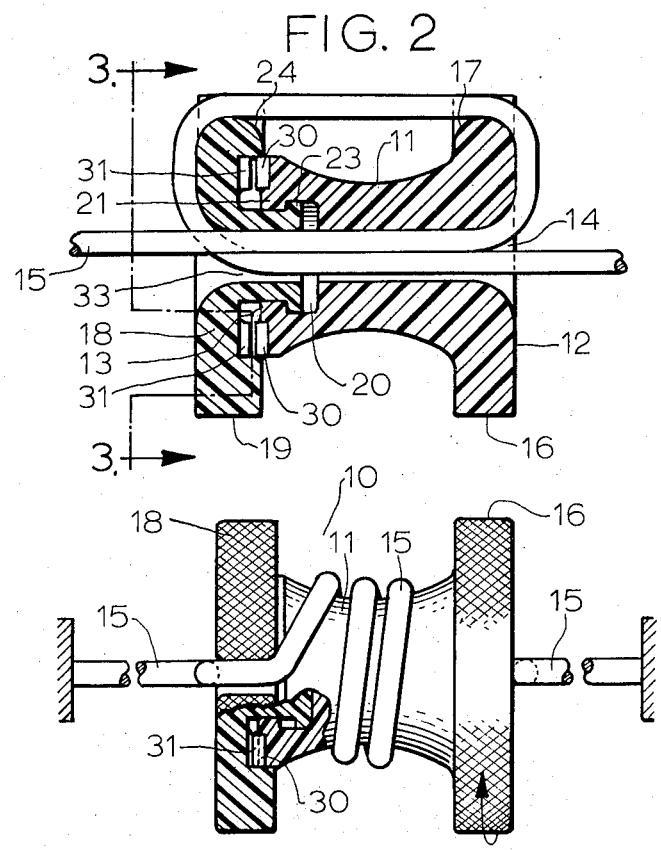
FIG. 2
FIG. 4
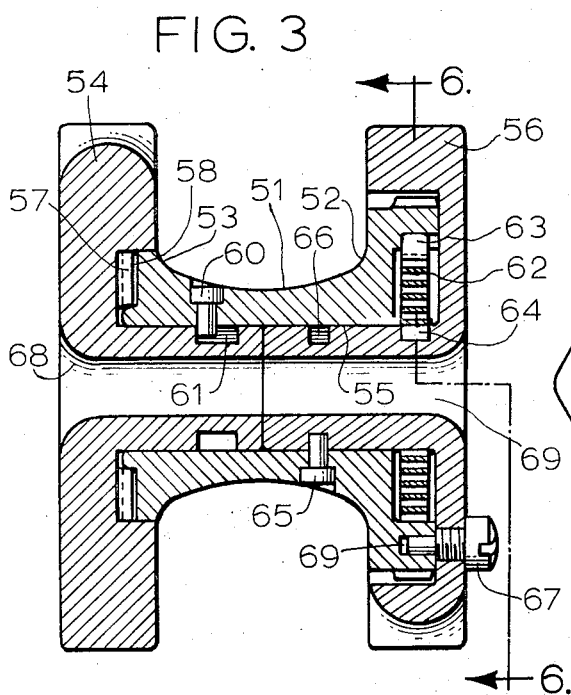
FIG. 5
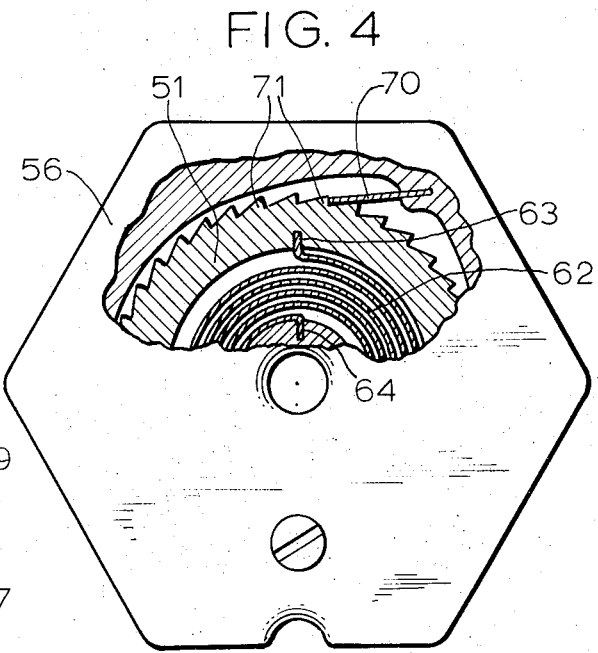
FIG. 6

CABLE TENSIONER

BACKGROUND OF THE INVENTION

Tensioners for flexible power and communication cables and for cables which secure upstanding structures are well known. Prior cable tensioners have relied upon clamping or some form of seizure of the cable which places strains on the cable and its insulation thereby causing cable degradation. This reduces cable service life requiring frequent cable replacement. They have not lent themselves to graduated tension adjustment which often results in the cables being too loose or excessive tension on the cable. Also, cable tensioners currently in use are constructed so that they themselves are placed under tension resulting in the possibility that they may be torn apart or otherwise damaged during their operation. All of the aforementioned deficiencies lead to frequent and costly maintenance.

There are particular applications where it is desired to maintain a constant or minimum tension on a cable notwithstanding variations in external conditions such as, temperature or wind velocity. Prior tensioners have in general been unable to suit such applications. Therefore, it is a general object of the invention to provide a cable tensioner which overcomes the deficiencies of prior structures.

It is a more particular object of the invention to provide a cable tensioner which allows fine graduated cable adjustment and which does not cause cable degradation.

It is a further object of the invention to provide a cable tensioner capable of maintaining a constant or minimum tension on a cable.

SUMMARY OF THE INVENTION

The present invention provides a cable tensioning device for flexible cables having a column member with first and second end faces and a longitudinal bore extending therebetween. The bore is dimensioned to receive a double strand of the flexible cable and the column includes at its first end face a guide to restrict movement of the cable. A rotatable member at the second end face of the column includes a bore aligned with that of the column member and means for bearing against the flexible cable. A locking means locks the rotatable member in fixed relation to the column member so that, with the cable threaded through the longitudinal bore from the first end face over the outer periphery of the device and again through the longitudinal bore, and with the rotatable member rotated, the flexible cable nestles in the guide and is wound around the column member by the bearing means thereon. The column member establishes an orderly overlay of the cable by its configuration. Thus, the cable is placed in controlled tension. The locking means maintains the cable in controlled tension.

BRIEF DESCRIPTION OF THE DRAWINGS

The invention, together with further objects and advantages thereof, may best be understood by reference to the following description in conjunction with the accompanying drawings and in the several figures of which like reference numerals indicate identical elements and in which:

FIG. 1 is a perspective view of a cable tensioning device embodying the present invention with a cable wound thereon;

FIG. 2 is a cross-sectional view of the cable tensioner of FIG. 1 with the cable shown prior to tensioning;

FIG. 3 is an end view, partially cut away, taken along line 3—3 of FIG. 2;

FIG. 4 is a side view, partially cut away, of the cable tensioning device of FIG. 1 after cable tensioning;

FIG. 5 is a cross-sectional side view of a cable tensioning device embodying a particular aspect of the present invention; and FIG. 6 is an end view, partially cut away, along line 6—6 of FIG. 5.

DESCRIPTION OF THE PREFERRED EMBODIMENTS

Referring to FIGS. 1 and 2, there is shown therein a tensioner 10 comprising a column member 11 in the shape of a spool having a first end face 12 and a second end face 13. Extending between the first and second end faces 12, 13, is a longitudinal bore 14 dimensioned to receive a double strand of the flexible cable 15. The spool 11 includes a peripheral flange 16 at the end face 12 having a notch 17 therein for holding the cable 15 in place.

A rotatable end cap member 18, having a peripheral flange 19, a bore 33, and a major surface 25 is carried at and overlies the second end face 13 of the spool 11. The flange 19 includes a notch 24 for receiving the cable 15 and which acts as a bearing surface against the cable when rotated. The second end face 13 includes a central cavity 20 and an abutment stop 21. The rotatable member 18 is shaped to include a cylindrical portion 22 terminated by a flange 23 which projects into the cavity 20. The flange coacts with abutment stop 21 to restrict axial movement of rotatable member 18. Bore 33 of rotatable member 18 is aligned with bore 14 of spool 11 and is of the same dimension.

For locking rotatable member 18 in fixed relation to the column member, column member 11 has a plurality of radially extending bevelled protrusions 30 on its end face 13. Rotatable member 18 has a like set of corresponding plurality of radially extending bevelled protrusions 31 at its major surface 25 which contacts the protrusions 30 of the end face 13. A portion of that construction is shown in the broken away section of FIG. 3.

FIG. 4 shows cable tensioner 10 after cable 15 has been placed under tension. Because the cable is looped through the tensioner, (FIG. 2) the cable holds the tensioner in compression so that the spool protrusions and rotatable member protrusions are in locked relationship, thereby maintaining rotatable member 18 and spool 11 in locked, fixed relation.

In operation, a flexible cable to be placed under tension is threaded through longitudinal bore 14 from first end face 12 to the second end 13, through rotatable member bore 33, past rotatable member 18, notch 24 and notch 17 and again through the longitudinal bore from the first end to the second end, and through the rotatable member bore. Abutment stop 21 and flange 22 of rotatable member 18 are dimensioned so that there is a space allowing lateral movement of rotatable member 18 relative to spool 11 to disengage locking protrusions 30, 31. Rotatable member 18 is then rotated, the cable bearing means notch 24 of rotatable member 18 causing cable 15 to wind about spool 11. When the desired tension is produced on cable 15, rotatable member 18 and column member 18 and column member 11 are allowed to come together so that locking protrusions 30, 31 are engaged. FIG. 2 shows the cable tensioner prior to locking, and FIG. 4 shows the cable tensioner in its locked position after cable 15 has been wound about spool 11 by a sufficient amount to place cable 15 under the desired tension.

As can be clearly seen, when cable 15 is placed under tension, cable tensioner 10 is in compression. Therefore, the tendsion on cable 15 holds the cable tensioner together, maintaining the locked relationship and also eliminating the possibility that the cable tensioner will be torn apart during its operation. Additionally, because there are a plurality of locking protrusions on the spool and rotatable member, the cable tensioner of the present invention provides fine graduated adjustment of cable tension. Obviously, by increasing the number of such protrusions on spool 11 and rotatable member 18, finer tension adjustment can be obtained. The outer surface of spool 11 is contoured inwardly from its end so that the flexible cable will be wound about column 11 in a controlled and predictable manner.

FIG. 5 shows a cable tensioner 50 which embodies a particular embodiment of the present invention. It maintains either a constant tension or a minimum tension on the cable. Tensioner 50 comprises a column member 51 of a generally spool configuration, a first rotatable end cap member 54 and a second rotatable end cap member 56. The spool has first and second ends 52, 53, and is contoured inwardly from its ends. At end 53 is located first rotatable end cap member 54 extending into longitudinal bore 55 of spool 51 and having a bore 68 dimensioned to receive a double strand of cable. At end 52 is second rotatable end cap member 56 also extending into longitudinal bore 55 and also having a bore 69 dimensioned to receive a double strand of cable. As shown, rotatable members 54, 56, meet in the center of the longitudinal bore 55, but it should be understood that this is not necessary. In the case where they do not meet, longitudinal bore 55 need only be of a dimension to receive a double strand of the cable.

End 53 of spool 51 and rotatable member 54 are constructed very similarly to the construction of the cable tensioning device as shown in FIGS. 1 through 4.

Rotatable member 54 has a plurality of radially extending bevelled protrusions 57 and spool 51 at end 53 has a like plurality of locking protrusions 58. Pin 60 extends through spool 51 into annular cutout 61 of rotatable member 54. The pin and cutout coact to restrict axial movement of rotatable member 54 in relation to spool 51 but allowing the disengagement of protrusions 57 and 58 when rotatable member 54 is rotated.

Rotatable member 56 is spring loaded in relation to spool 51 by spring 62. As can be more clearly seen in FIG. 6, spring 62 has a first tab 63 inserted into spool 51, and a second tab 64 inserted into rotatable member 56. Pin 65 extends through spool 51 into an annular groove 66 of rotatable member 56 in relation to spool 51. Screw 67 extends through rotatable member 56 into hole 69 on spool 51. Screw 67 locks rotatable member 56 in fixed relation to spool 51.

In operation, rotatable member 56 is rotated until the proper spring loading between spool 51 and rotatable member 56 is obtained. Then, screw 67 is threaded into hole 69 to maintain the spring loading. The cable is then threaded onto the spool in the ame manner as shown in FIG. 2. Rotatable member 54 is then rotated to take up the additional slack on the cable after which screw 67 is then removed. In this condition, the cable is under tension and the cable tensioner is held together under compression. With screw 67 removed, the spring maintains constant tension on the cable. Therefore, should external conditions change such as wind velocity or ambient temperature, the cable tensioner rotatable member 56 will rotate about spool 51 in either angular direction to maintain the constant tension on the cable.

A further modification of the cable tensioner of the present invention may most clearly be seen in FIG. 6. In this arrangement, the cable tensioner comprises the additional elements of a pawl including flexible arm 70 on rotatable member 56 and teeth 71 on spool 51. In this arrangement, the pawl in conjunction with the spring allows a minimum tension to be maintained on the cable. Should the tension on the cable increase, the pawl arrangement will retard rotation of rotatable member 56. On the other hand, should the tension on the cable decrease, the pawl arrangement will allow rotatable member 56 to rotate to thereby maintain a minimum tension on the cable. Although rotatable member 56 is shown having an outer hexagonal configuration, it could, of course, have a round configuration of the cable tensioner shown in FIGS. 1 through 4 or any other convenient configuration.

The cable tensioner of the present invention allows fine graduated adjustments to be made in cable tension. Because the cable is threaded onto the cable tensioner to place the cable tensioner under compression during its operation, the possibility of its damage is greatly diminished. Additionally, it can be appreciated from the drawings, the cable is not pinched or otherwise crimped thus extending the cable's useful life. All of the foregoing decreases the amount of service required for maintaining the cables and thus diminishes the cost of using such cables with the present invention.

While particular embodiments of the invention have been shown and described, modifications may be made, and it is intended in the appended claims to cover all such modifications as may fall within the spirit and scope of the invention.

I claim:

1. A tensioning device for flexible cables comprising:

a column member having first and second end faces and a longitudinal bore extending therebetween of a dimension to receive a double strand of the flexible cable, said column including cable guide means at said first end face to restrict movement of the cable;

a rotatable member at said second end face of said column member and including a bore aligned with said longitudinal bore and a bearing surface for the flexible cable projecting beyond the periphery of said column member; and means for locking said rotatable member in fixed relation to said column member;

whereby with the cable threaded from said first end face through the bore of said column member and said rotatable member, over the periphery of said rotatable member and said column member and through said guide means and threaded again from said first end face through the bore of said column member and rotatable member, a loop is formed in the cable and the cable is fixed to said column member, so that with rotation of said rotatable member the cable is wound around said column member at said bearing surface and thereby placed under controlled tension.

2. A cable tensioning device in accordance with claim 1 wherein said column member is a cylindrical spool having a radially projecting flange at said first end face notched to receive the cable and forming said cable guide means.

3. A cable tensioning device in accordance with claim 1 wherein said rotatable member comprises an end cap having a major surface contiguous with said second end face of said column member.

4. A cable tensioning device in accordance with claim 3 wherein said locking means includes a plurality of protrusions on said second end face, and a corresponding plurality of protrusions on said end cap major surface, whereby as the cable is placed under controlled tension by relative rotation of said column member and said end cap, said protrusions thereon mate and lock said members against counter rotation.

5. A tensioning device for flexible cables comprising:

a column member having first and second ends and a longitudinal bore extending therebetween;
a first rotatable member at said first end of said column member including a bore aligned with said longitudinal bore and means for bearing against the flexible cable;
first locking means for locking said first rotatable member in fixed relation to said column member;
a second rotatable member at said second end of said column member and including a bore aligned with said longitudinal bore and means for bearing against the flexible cable; and
second locking means for locking said second rotatable member in fixed relation to said column member:

whereby with the flexible cable threaded through said bores from said first rotatable member to said second rotatable member, over said second and first ends and again through said bores from said first rotatable member to said second rotatable member, as said rotatable members are rotated in opposite angular directions, the flexible cable is wound around said column member by said cable bearing means and placed under controlled tension.

6. A cable tensioning device in accordance with claim 5 wherein said column member is a cylindrical spool.

7. A cable tensioning device in accordance with claim 5 wherein said second rotatable member is spring loaded in relation to said column member thereby providing a constant tension on the cable.

8. A cable tensioning device in accordance with claim 7 wherein said spring loaded rotatable member further comprises a pawl arrangement to thereby maintain a minimum tension on the cable.

9. A cable tensioning device in accordance with claim 5 wherein said first rotatable member comprises a first end cap and said second rotatable member comprises a second end cap.

10. A cable tensioning device in accordance with claim 9 wherein said first locking means comprises a plurality of protrusions on said column member and a corresponding plurality of protrusions on said first end cap.

11. A cable tensioning device in accordance with claim 9 wherein said first end cap is dimensioned to constitute a first peripheral flange about said column member and said second end cap is dimensioned to constitute a second peripheral flange about said column member.

12. A cable tensioning device in accordance with claim 11 wherein said first end cap cable bearing means comprises a notch in said first flange, and said second end cap cable bearing means comprises a notch in said second flange.

* * * * *